(12) United States Patent
Zettel et al.

(10) Patent No.: US 8,091,667 B2
(45) Date of Patent: Jan. 10, 2012

(54) METHOD FOR OPERATING A HYBRID ELECTRIC POWERTRAIN BASED ON PREDICTIVE EFFECTS UPON AN ELECTRICAL ENERGY STORAGE DEVICE

(75) Inventors: Andrew M. Zettel, Ann Arbor, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 879 days.

(21) Appl. No.: 11/422,700

(22) Filed: Jun. 7, 2006

(65) Prior Publication Data

US 2007/0284162 A1 Dec. 13, 2007

(51) Int. Cl.
*B60K 6/28* (2007.10)
*B60W 20/00* (2006.01)

(52) U.S. Cl. ................................ 180/65.29; 903/907
(58) Field of Classification Search ............. 180/65.265, 180/65.285, 65.29; 903/906, 907; 701/22
See application file for complete search history.

(56) References Cited

U.S. PATENT DOCUMENTS

| | | | | |
|---|---|---|---|---|
| 3,703,675 A | * | 11/1972 | Alric et al. | ........... 320/159 |
| 4,335,429 A | * | 6/1982 | Kawakatsu | ........... 180/65.285 |
| 5,144,218 A | * | 9/1992 | Bosscha | ........... 320/139 |
| 5,166,595 A | * | 11/1992 | Leverich | ........... 320/139 |
| 5,698,955 A | * | 12/1997 | Nii | ........... 318/139 |
| 5,751,137 A | * | 5/1998 | Kiuchi et al. | ........... 322/14 |
| 5,804,947 A | * | 9/1998 | Nii et al. | ........... 322/16 |
| 5,806,617 A | * | 9/1998 | Yamaguchi | ........... 180/65.235 |
| 5,995,895 A | * | 11/1999 | Watt et al. | ........... 701/50 |
| 6,016,457 A | * | 1/2000 | Toukura et al. | ........... 701/70 |
| 6,321,143 B1 | * | 11/2001 | Phillips et al. | ........... 701/22 |
| 6,832,148 B1 | | 12/2004 | Bennett | |
| 6,868,318 B1 | | 3/2005 | Cawthorne | |
| 6,953,409 B2 | * | 10/2005 | Schmidt et al. | ........... 475/5 |
| 7,154,236 B1 | | 12/2006 | Heap | |
| 2002/0188387 A1 | * | 12/2002 | Woestman et al. | ........... 701/22 |
| 2003/0184307 A1 | * | 10/2003 | Kozlowski et al. | ........... 324/427 |
| 2005/0001625 A1 | | 1/2005 | Ashtiani et al. | |
| 2005/0076958 A1 | | 4/2005 | Foster | |
| 2005/0077867 A1 | | 4/2005 | Cawthorne | |
| 2005/0077877 A1 | | 4/2005 | Cawthorne | |
| 2005/0080523 A1 | | 4/2005 | Bennett | |
| 2005/0080527 A1 | | 4/2005 | Tao | |
| 2005/0080535 A1 | | 4/2005 | Steinmetz | |
| 2005/0080537 A1 | | 4/2005 | Cawthorne | |
| 2005/0080538 A1 | | 4/2005 | Hubbard | |
| 2005/0080539 A1 | | 4/2005 | Hubbard | |
| 2005/0080540 A1 | | 4/2005 | Steinmetz | |
| 2005/0080541 A1 | | 4/2005 | Sah | |
| 2005/0182526 A1 | | 8/2005 | Hubbard | |
| 2005/0182543 A1 | | 8/2005 | Sah | |
| 2005/0182546 A1 | | 8/2005 | Hsieh | |
| 2005/0182547 A1 | | 8/2005 | Sah | |
| 2005/0189918 A1 | | 9/2005 | Weisgerber | |
| 2005/0252283 A1 | | 11/2005 | Heap | |
| 2005/0252305 A1 | | 11/2005 | Hubbard | |
| 2005/0252474 A1 | | 11/2005 | Sah | |
| 2005/0255963 A1 | | 11/2005 | Hsieh | |
| 2005/0255964 A1 | | 11/2005 | Heap | |
| 2005/0255965 A1 | | 11/2005 | Tao | |
| 2005/0255966 A1 | | 11/2005 | Tao | |

(Continued)

*Primary Examiner* — Frank B Vanaman

(57) ABSTRACT

A hybrid electric powertrain includes an electrical energy storage device and electric machines. A method for operating the powertrain to control the electric machines is effective to attain a predetermined state of life profile for the electric energy storage device.

11 Claims, 4 Drawing Sheets

U.S. PATENT DOCUMENTS

| | | |
|---|---|---|
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2005/0274553 A1* | 12/2005 | Salman et al. ............... 180/65.2 |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0112412 A1 | 4/2009 | Cawthorne |
| 2009/0118917 A1 | 5/2009 | Sah |
| 2009/0144002 A1 | 6/2009 | Zettel |

* cited by examiner

METHOD FOR OPERATING A HYBRID ELECTRIC POWERTRAIN BASED ON PREDICTIVE EFFECTS UPON AN ELECTRICAL ENERGY STORAGE DEVICE

TECHNICAL FIELD

This invention pertains generally to an electrical energy storage device. More particularly, the invention is concerned with predicting effects upon an electrical energy storage device and managing state of life based thereon.

BACKGROUND OF THE INVENTION

Various hybrid propulsion systems for vehicles use electrical energy storage devices to supply electrical energy to electrical machines, which are operable to provide motive torque to the vehicle, often in conjunction with an internal combustion engine. An exemplary hybrid powertrain architecture comprises a two-mode, compound-split, electro-mechanical transmission which utilizes an input member for receiving power from a prime mover power source and an output member for delivering power from the transmission to a vehicle driveline. First and second electric machines, i.e. motor/generators, are operatively connected to an energy storage device for interchanging electrical power therebetween. A control unit is provided for regulating the electrical power interchange between the energy storage device and the electric machines. The control unit also regulates electrical power interchange between the first and second electric machines.

One of the design considerations in vehicle powertrain systems is an ability to provide consistent vehicle performance and component/system service life. Hybrid vehicles, and more specifically the battery pack systems utilized therewith, provide vehicle system designers with new challenges and tradeoffs. It has been observed that service life of an electrical energy storage device, e.g. a battery pack system, increases as resting temperature of the battery pack decreases. However, cold operating temperature introduces limits in battery charge/discharge performance until temperature of the pack is increased. A warm battery pack is more able to supply required power to the vehicle propulsion system, but continued warm temperature operation may result in diminished service life.

Modern hybrid vehicle systems manage various aspects of operation of the hybrid system to effect improved service life of the battery. For example, depth of battery discharge is managed, amp-hour (A-h) throughput is limited, and convection fans are used to cool the battery pack. Ambient environmental conditions in which the vehicle is operated has largely been ignored. However, the ambient environmental conditions may have significant effect upon battery service life. Specifically, same models of hybrid vehicles released into various geographic areas throughout North America would likely not result in the same battery pack life, even if all the vehicles were driven on the same cycle. The vehicle's environment must be considered if a useful estimation of battery life is to be derived. Additionally, customer expectations, competition and government regulations impose standards of performance, including for service life of battery packs, which must be met.

It would be useful to include in a hybrid control system an ability to estimate or otherwise determine a potential effect that an operating parameter, e.g. electrical current level, has on life of a battery pack, in order to use such information to proactively control operation of the hybrid powertrain system to optimize battery life.

SUMMARY OF THE INVENTION

A hybrid electric powertrain includes an electrical energy storage device adapted for exchanging electrical energy with a hybrid vehicular powertrain including first and second electric machines. Each machine is operable to impart torque to a two-mode, compound-split electro-mechanical transmission having four fixed gear ratios and two continuously variable operating modes. A method for operating the powertrain includes establishing a plurality of values for current of the electrical energy storage device during periods of vehicle activity and, for each respective value, determining a corresponding change in state of life for the energy storage device based upon the respective value. The electric machines are operated based on the determined changes in state of life. Preferably, the electric machines are operated to effect a predetermined state of life profile. In accordance with an embodiment, such state of life profile is effected by limiting allowable electric machine currents in accordance with the determined changes in state of life and predetermined state of life profile. In accordance with an alternate embodiment, such state of life profile is effected by establishing electric machine currents in accordance with the determined changes in state of life and predetermined state of life profile. Preferably, change in the state of life is determined based upon an integration of electrical current, a depth of discharge of the energy storage device, and, an operating temperature factor of the electrical energy storage device. Depth of discharge of the electrical energy storage device is preferably determined based upon the electrical current. And, the operating temperature factor of the electrical energy storage device is determined based upon the electrical current and temperature of the electrical energy storage device.

BRIEF DESCRIPTION OF THE DRAWINGS

The invention may take physical form in certain parts and arrangement of parts, an embodiment of which is described in detail herein and illustrated in the accompanying drawings which form a part hereof, and wherein.

DETAILED DESCRIPTION OF THE PREFERRED EMBODIMENT

Figure 1:
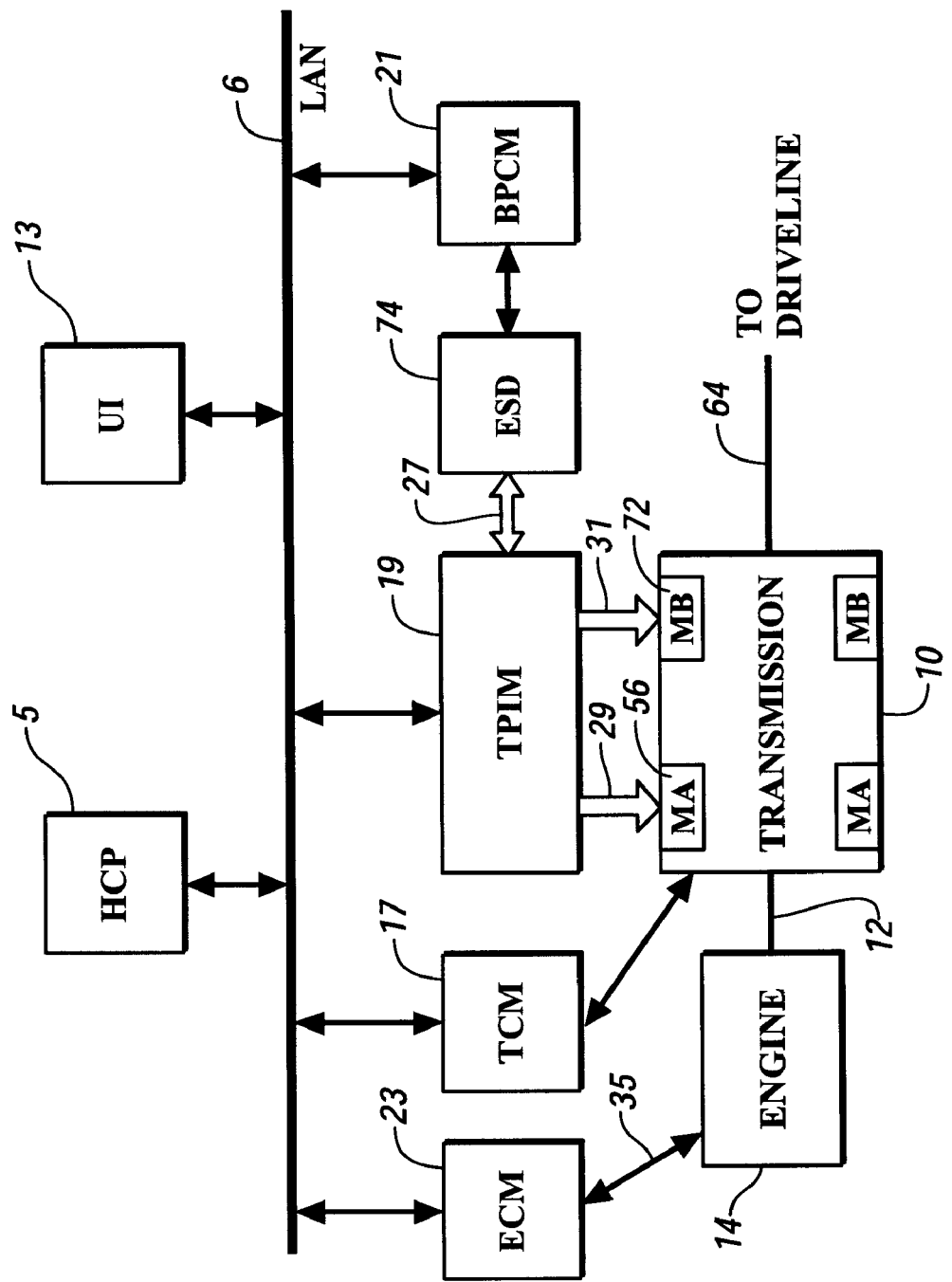
FIG. 1 is a schematic diagram of an exemplary architecture for a control system and powertrain, in accordance with the present invention.

Referring now to the drawings, wherein the showings are for the purpose of illustrating the invention only and not for the purpose of limiting the same, FIG. 1 shows a control system and an exemplary hybrid powertrain system which has been constructed in accordance with an embodiment of the invention. The exemplary hybrid powertrain system comprises a plurality of torque-generative devices operable to supply motive torque to a transmission device, which supplies motive torque to a driveline. The torque-generative devices preferably comprise an internal combustion engine 14 and first and second electric machines 56, 72 operable to convert electrical energy supplied from an electrical storage device 74 to motive torque. The exemplary transmission device 10 comprises a two-mode, compound-split electro-mechanical transmission having four fixed gear ratios, and includes a plurality of gears operable to transmit the motive torque to an output shaft 64 and driveline through a plurality of torque-transfer devices contained therein. Mechanical aspects of exemplary transmission 10 are disclosed in detail in U.S. Pat. No. 6,953, 409, entitled "Two-Mode, Compound-Split, Hybrid Electro-Mechanical Transmission having Four Fixed Ratios", which is incorporated herein by reference.

The control system comprises a distributed control module architecture interacting via a local area communications network to provide ongoing control to the powertrain system, including the engine 14, the electrical machines 56, 72, and the transmission 10.

The exemplary powertrain system been constructed in accordance with an embodiment of the present invention. The hybrid transmission 10 receives input torque from torque-generative devices, including the engine 14 and the electrical machines 56, 72, as a result of energy conversion from fuel or electrical potential stored in electrical energy storage device (ESD) 74. The ESD 74 typically comprises one or more batteries. Other electrical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and, propulsion requirements such as emissions, power assist and electric range. The ESD 74 is high voltage DC-coupled to transmission power inverter module (TPIM) 19 via DC lines referred to as transfer conductor 27. The TPIM 19 transfers electrical energy to the first electrical machine 56 by transfer conductors 29, and the TPIM 19 similarly transfer electrical energy to the second electrical machine 72 by transfer conductors 31. Electrical current is transferable between the electrical machines 56, 72 and the ESD 74 in accordance with whether the ESD 74 is being charged or discharged. TPIM 19 includes the pair of power inverters and respective motor control modules configured to receive motor control commands and control inverter states therefrom to provide motor drive or regeneration functionality.

The electrical machines 56, 72 preferably comprise known motor/generator devices. In motoring control, the respective inverter receives current from the ESD and provides AC current to the respective motor over transfer conductors 29 and 31. In regeneration control, the respective inverter receives AC current from the motor over the respective transfer conductor and provides current to the DC lines 27. The net DC current provided to or from the inverters determines the charge or discharge operating mode of the electrical energy storage device 74. Preferably, machine A 56 and machine B 72 are three-phase AC electrical machines and the inverters comprise complementary three-phase power electronic devices.

The elements shown in FIG. 1, and described hereinafter, comprise a subset of an overall vehicle control architecture, and are operable to provide coordinated system control of the powertrain system described herein. The control system is operable to gather and synthesize pertinent information and inputs, and execute algorithms to control various actuators to achieve control targets, including such parameters as fuel economy, emissions, performance, driveability, and protection of hardware, including batteries of ESD 74 and machines A and B 56, 72. The distributed control module architecture of the control system comprises an engine control module ('ECM') 23, transmission control module ('TCM') 17, battery pack control module ('BPCM') 21, and the Transmission Power Inverter Module ('TPIM') 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and, vehicle speed cruise control. Within the control system, each of the aforementioned control modules communicates with other control modules, sensors, and actuators via a local area network ('LAN') communications bus 6. The LAN bus 6 allows for structured communication of control parameters and commands between the various control modules. The specific communication protocol utilized is application-specific. By way of example, one communications protocol is the Society of Automotive Engineers standard J1939. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, the HCP 5 generates various commands, including: an engine torque command, clutch torque commands, for various clutches of the hybrid transmission 10; and motor torque commands, for the electrical machines A and B, respectively.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates an axle torque request. For simplicity, ECM 23 is shown generally having bi-directional interface with engine 14 via aggregate line 35. Various parameters that are sensed by ECM 23 include engine coolant temperature, engine input speed to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command control signals, i.e. clutch torque commands to the clutches of the transmission.

The BPCM 21 interacts with various sensors associated with the ESD 74 to derive information about the state of the ESD 74 to the HCP 5. Such sensors comprise voltage and electrical current sensors, as well as ambient sensors operable to measure operating conditions of the ESD 74 including, e.g., temperature and internal resistance of the ESD 74. Sensed parameters include ESD voltage, $V_{BAT}$, ESD current, $I_{BAT}$, and ESD temperature, $T_{BAT}$. Derived parameters preferably include, ESD internal resistance, $R_{BAT}$, ESD state of charge, SOC, and other states of the ESD, including available electrical power, $P_{BAT\_MIN}$ and $P_{BAT\_MAX}$.

The Transmission Power Inverter Module (TPIM) 19 includes the aforementioned power inverters and motor control modules configured to receive motor control commands and control inverter states therefrom to provide motor drive or regeneration functionality. The TPIM 19 is operable to generate torque commands for machines A and B based upon input from the HCP 5, which is driven by operator input through UI 13 and system operating parameters. Motor torques are implemented by the control system, including the TPIM 19, to control the machines A and B. Individual motor speed signals are derived by the TPIM 19 from the motor phase information or conventional rotation sensors. The TPIM 19 determines and communicates motor speeds to the HCP 5.

Each of the aforementioned control modules of the control system is preferably a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The action described hereinafter occurs during active operation of the vehicle, i.e. that period of time when operation of the engine and electrical machines are enabled by the vehicle operator, typically through a 'key-on' action. Quiescent periods include periods of time when operation of the engine and electrical machines are disabled by the vehicle operator, typically through a 'key-off' action. In response to an operator's action, as captured by the UI 13, the supervisory HCP control module 5 and one or more of the other control modules determine required transmission output torque, $T_o$. Selectively operated components of the hybrid transmission 10 are appropriately controlled and manipulated to respond to the operator demand. For example, in the exemplary embodiment shown in FIG. 1, when the operator has selected a forward drive range and manipulates either the accelerator pedal or the brake pedal, the HCP 5 determines how and when the vehicle is to accelerate or decelerate. The HCP 5 also monitors the parametric states of the torque-generative devices, and determines the output of the transmission required to effect a desired rate of acceleration or deceleration. Under the direction of the HCP 5, the transmission 10 operates over a range of output speeds from slow to fast in order to meet the operator demand.

Figure 2:
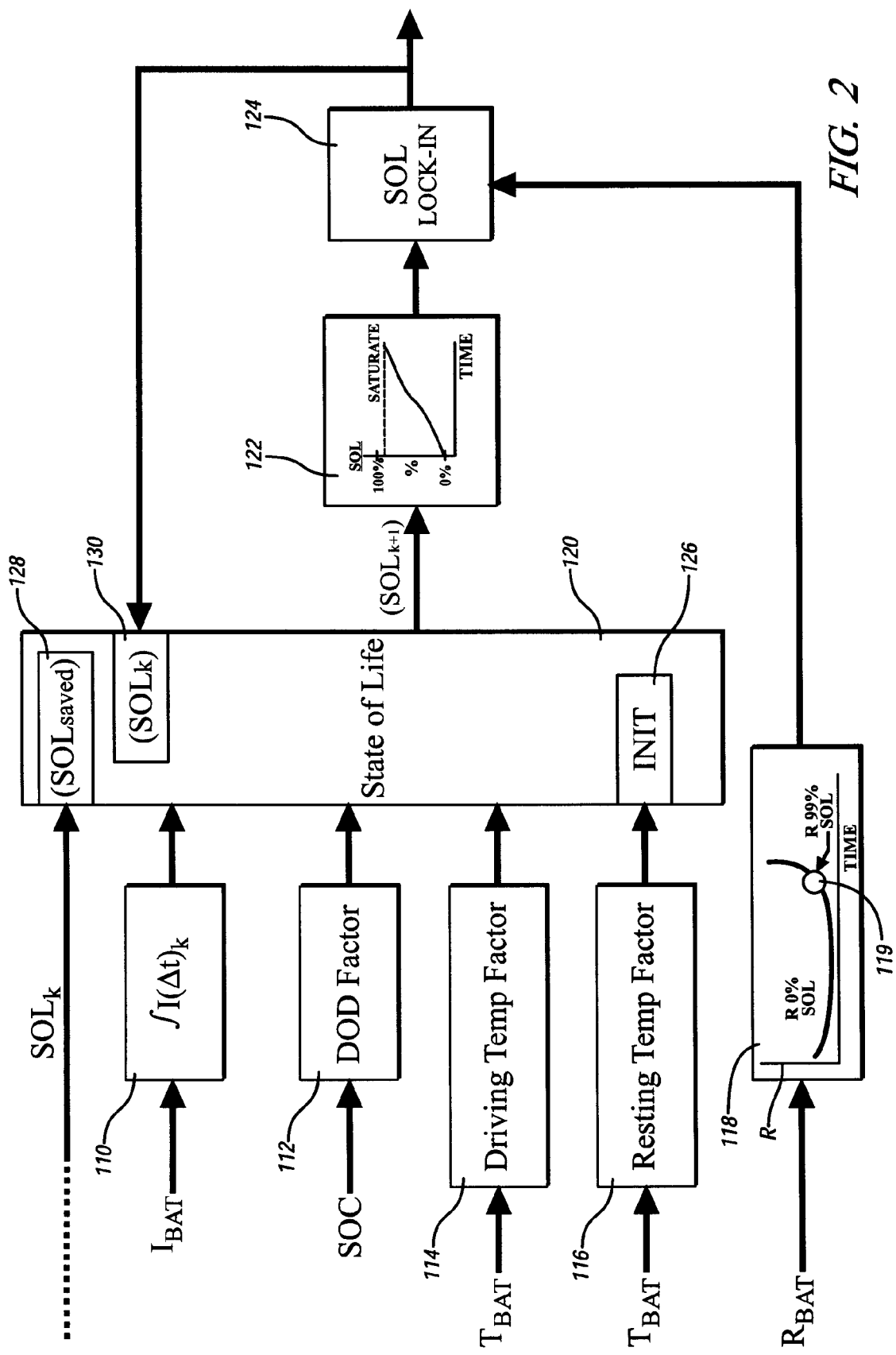
FIGS. 2 and 3 are algorithmic block diagrams, in accordance with the present invention; and, FIG. 4 is an exemplary data graph, in accordance with the present invention.

Referring now to FIG. 2, a method and apparatus to estimate a state-of-life ('SOL') of an energy storage device useable in a hybrid control system in real-time is described. The exemplary method and apparatus to estimate state-of-life ('SOL') of the energy storage device in the hybrid control system in real-time is disclosed in detail in U.S. patent application Ser. No. 11/422,691, entitled "Method and Apparatus for Real-time Life Estimation of an Electric Energy Storage Device in a Hybrid Vehicle", which is incorporated herein by reference. The exemplary method and apparatus to estimate state-of-life comprises an algorithm that monitors an electrical current and a state-of-charge and temperature of the electrical energy storage device 74 during operation. Temperature of the electrical energy storage device 74 is further monitored during quiescent periods of ESD operation. Quiescent periods of ESD operation are characterized by ESD power flow that is de minimus whereas active periods of ESD operation are characterized by ESD power flow that is not de minimus. That is to say, quiescent periods of ESD operation are generally characterized by no or minimal current flow into or out of the ESD. With respect to an ESD associated with a hybrid vehicle propulsion system for example, quiescent periods of ESD operation may be associated with periods of vehicle inactivity (e.g. powertrain, including electric machines, is inoperative such as during periods when the vehicle is not being driven and accessory loads are off but may include such periods characterized by parasitic current draws as are required for continuing certain controller operations including, for example, the operations associated with the present invention). Active periods of ESD operation in contrast may be associated with periods of vehicle activity (e.g. accessory loads are on and/or the powertrain, including electric machines, is operative such as during periods when the vehicle is being driven wherein current flows may be into or out of the ESD) The state of life ('SOL') of the electrical energy storage device 74 is determined based upon the ESD current, the state of charge of the ESD, and the temperature of the ESD during quiescent and active periods of operation. The inputs to calculation of SOL, include ESD internal resistance $R_{BAT}$, ESD temperature $T_{BAT}$, ESD state of charge SOC, and ESD current $I_{BAT}$. These are known operating parameters measured or derived within the distributed control system. From these parameters, an A-h integration factor 110, a depth of discharge ('DOD') factor 112, a driving temperature factor 114, and a resting temperature factor, $T_{REST}$, 116 are determined, and provided as input to determine a parameter for SOL. The operating parameters used to calculate SOL include: ESD current, $I_{BAT}$, which is monitored in real-time, measured in amperes, and integrated as a function of time; magnitude of electrical current flowing through the ESD 74 during each active charging and discharging event; ESD state-of-charge ('SOC'), including depth-of-discharge ('DOD'); and, ESD temperature factor during active periods of operation, referred to as $T_{DRIVE}$. The inputs of $R_{BAT}$, $T_{BAT}$, SOC, and $I_{BAT}$, are known operating parameters within the distributed control system. The input $T_{REST}$ is a derived parametric value.

Figure 3:
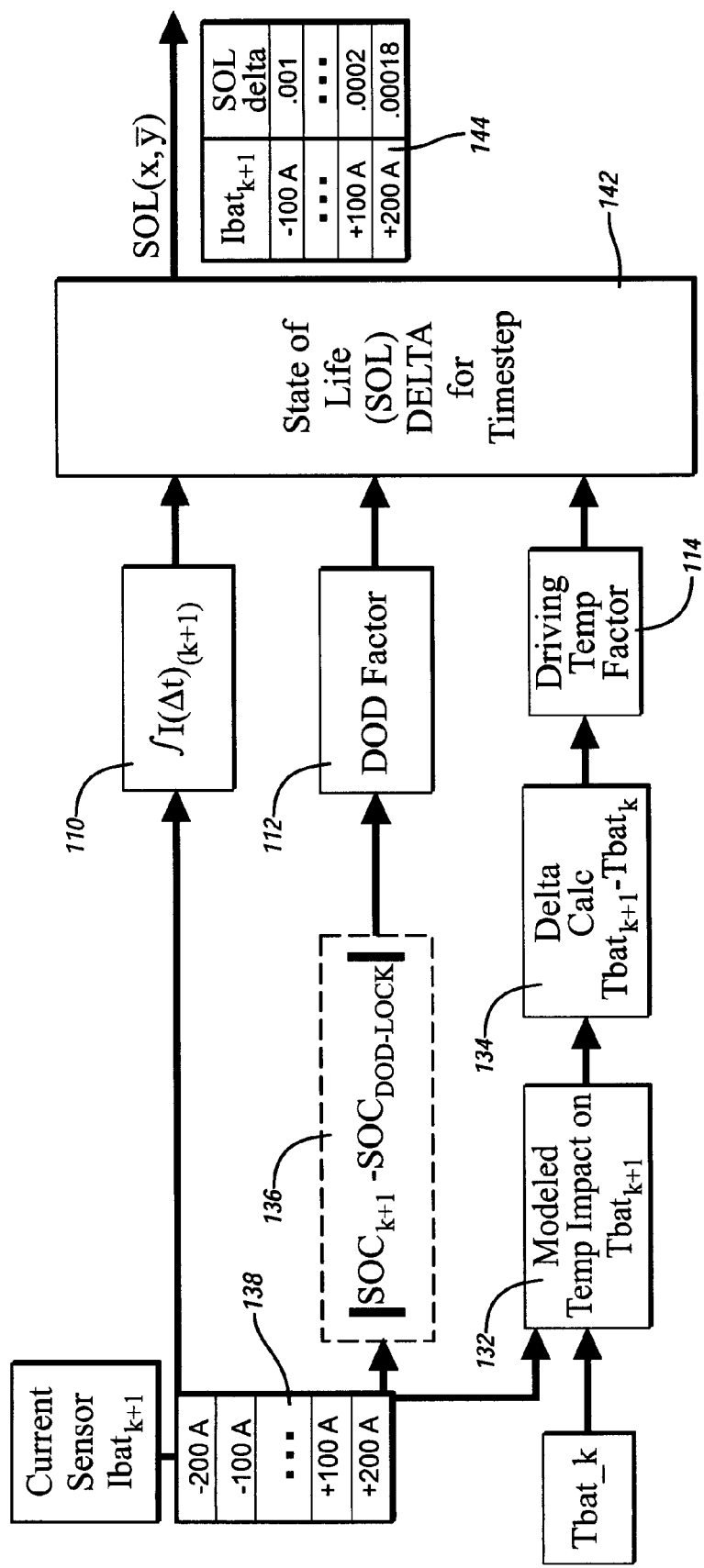

Referring now to FIG. 3, a schematic diagram of an algorithm, preferably executed in one of the aforementioned control modules, is described which is executed in the control system to pre-calculate an array of possible changes in ESD state of life, $SOL_{delta}$, for a subsequent time-step, k+1, for each control degree of freedom. In this embodiment, the selected control degree of freedom comprises ESD current, $T_{BAT}$. The algorithm is executed to determine an effect upon ESD state of life at a subsequent time-step for the array of ESD electrical current levels, to optimize vehicle operation and control based upon SOL of the ESD 74. This comprises estimating values for a change in SOL, referred to as $SOL_{delta}$, over a range of current levels, as follows.

Figure 4:
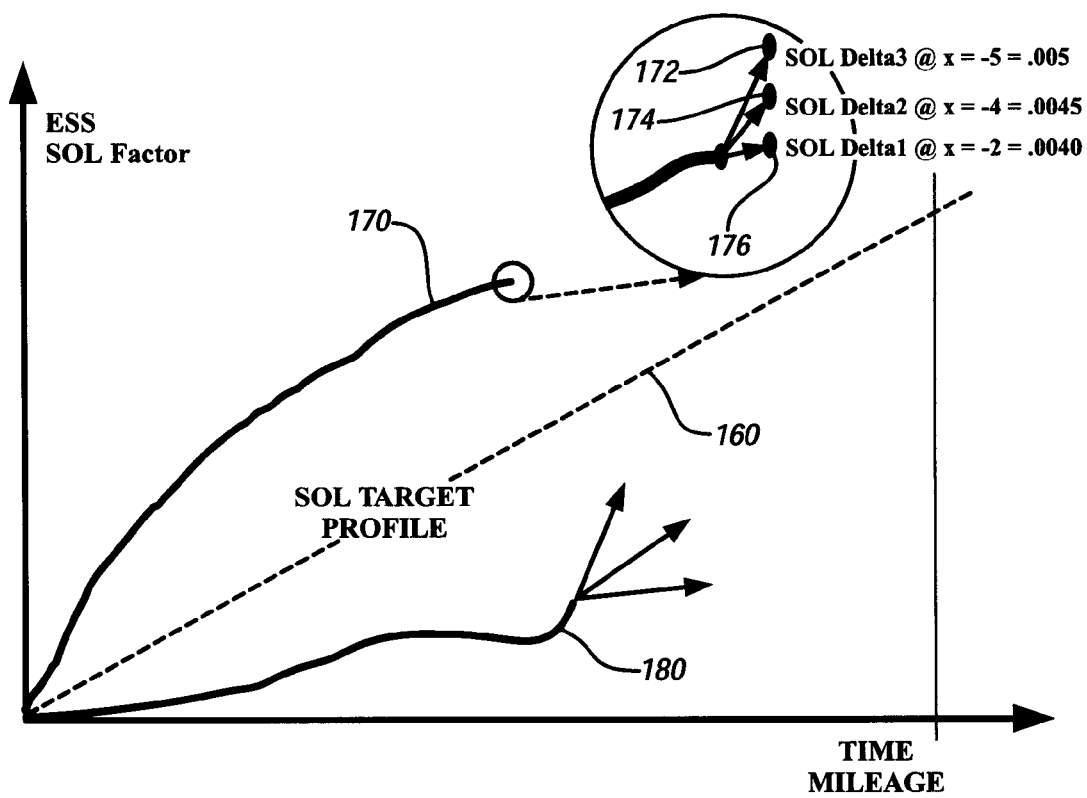

The estimated SOL factor is represented by Eq. 1:

$$SOL_{k+1} = SOLdelta(x, \vec{y}) + SOL_k \quad [1]$$

wherein:

$SOL_{k+1}$ is a State of Life parameter calculated for a subsequent iteration, k+1, typically a time step equal to elapsed time until the subsequent loop cycle in the control system;

$SOL_k$ is the most recently calculated State of Life parameter;

SOLdelta(x, y) comprises parameter, $SOL_{delta}$, calculated for given x, y values; and, SOLdelta(x, y) comprises a vector containing a range of the parameters, $SOL_{delta}$, wherein values for y are held constant, while values for x are incremented over a range. The SOLdelta parameter determined is preferably used by the aforementioned hybrid vehicle control system for optimization in conjunction with other system constraints. This is shown graphically with reference to FIG. 4, and specifically items 170, 172, 174, and 176.

Referring again to FIG. 3, the algorithm operates by monitoring input parameter $T_{BAT\_K}$, comprising temperature of the ESD 74 at point in time, k. The ESD current for the subsequent time step, k+1, referred to as $I_{BAT\_K+1}$, comprises the aforementioned array of ESD electrical current values as shown at 138, in this instance from −200 amperes to +200 amperes in incremental values of 100 amperes, wherein the positive and negative symbols refer to direction of current flow, for charging and discharging of the ESD 74, respectively. All other parameters ($\vec{y}$) in Eq. 1 to calculate $SOL_{delta}$ are held constant. The input parameters used in calculation of $SOL_{delta}$, including current-integration 110, depth of discharge factor 112, driving temperature factor 114, are determined for each value of ESD current for the subsequent time step, $I_{BAT\_K+1}$. A second array 144, comprising a table of $SOL_{delta}$ values determined based upon ESD current, $I_{BAT\_K+1}$, is calculated and useable by the control system to make decisions regarding subsequent operation of the vehicle.

Estimation of total cumulated effect on current A-h integration component 110 can be directly calculated for of the array of current values 138, in this instance from −200 amperes to +200 amperes in incremental values of 100 amperes, for time step k+1. The A-h integration component 110 to $SOL_{delta}$ is used to calculate a final value for $SOL_{delta}$ for each cell in the SOLdelta(x,y) vector. A cumulative value of A-h/mile driven is generally known for each vehicle, and typically comprises a direct linear relationship between values for ESD current and $SOL_{delta}$.

Estimation of effect upon depth of discharge (DOD) is knowable, as follows. A parametric value for SOC is known at time, k. The value for electrical current, shown with reference to vector 138, is used in calculation of a parametric value for SOC, as shown in 136, wherein the resulting $SOC_{k+1}$ is calculated. This value is then compared to the $SOC_{DOD-LOCK}$, which comprises a ESD state-of-charge achieved at the subsequent calculation cycle were the proposed current commanded. The contribution of the DOD effect on SOC increases as the system exceeds the SOC-DOD LOCK IN threshold, which has a parametric value of 75% in this embodiment. This means the system penalizes departures from a SOC target area. The system greatly penalizes SOC when, for example, an action by the controller causes ESD discharge below a set value, e.g. 40%, as a result of an action such as an extended vehicle acceleration. A resulting parametric value for Depth-of-Discharge 112 is passed into the DOD-SOL impact table. This SOL delta component is then submitted to the $SOL_{delta}$ calculation.

Estimating an effect based upon ESD operating temperature comprises calculating estimates of heat transfer to the ESD caused by the upcoming change of the control parameter, $I_{BAT}$. This provides an indication of an amount the ESD is warmed up during the elapsed time. The ESD heating value is determined by inputting each value for the current, $I_{BAT\_K+1}$, to a mathematical model of the ESD 74, which includes one or more vectors or matrices of resistance as a function of SOC and temperature. The matrix may be based upon predetermined calibration based upon laboratory data or a calculated resistance from a control module. The calculation is further based upon thermal mass of the ESD 74, and any ESD cooling system capability. An estimate of thermal change 134 is determined, based on a control operation, as shown in block 134, and referred to as a difference between ESD temperatures at times k and k+1, i.e. ($T_{BAT\_K+1}-T_{BAT\_K}$), which is determined based upon the control parameter, $I_{BAT}$ at time, k+1. Driving temperature factor is determined at block 114, which is passed to the $SOL_{delta}$ calculation of block 142 for the timestep, k+1. This result occurs because operating temperatures and resting temperatures affect ESD total life. The time integrated current factor from block 110, the DOD factor from block 112, and the driving temperature factor from block 114 comprise the inputs to Block 142, which determines a parametric value for $SOL_{delta}$ for each current value of the array of current values input to the algorithm from block 138. An array of values as previously described, are created in the SOLdelta(x, y) vector 144.

As an example, operating a hybrid vehicle to maximize ESD current and charging typically leads to large amounts of current passing through the ESD. The parameter for A-h/mile is likely higher than for an average operator, and the A-h component for calculation of SOLdelta(x, y) likely reflects fairly high values for $SOL_{delta}$ at all positive and negative current values. However, because the control system has enough time to adapt to driving style of various operators (usually more astute drivers attempt to maximize operation in a recharging mode, e.g. regenerative braking, and identify areas of ESD boost), the State of Charge in this example remains at an optimal level around 75%+/−2%. At the given moment of the calculation, with SOC at 74.5, the $SOC_{DOD-LOCK}$ value of block 136 was at 74.9. The instantaneous DOD at this point is only 0.4% DOD. This translates to a relatively small effect upon $SOL_{delta}$ for all $I_{bat/k+1}$ current values. Stated differently, in the next timestep, there is limited risk to SOL related directly to a large depth of discharge.

Lastly, when the operator most likely started with a high ESD temperature while passing large quantities of current through the ESD, which most likely warms it beyond the capability of its cooling system, the effect due to low current levels are likely reasonable. However at higher positive charging currents there would be larger effect upon $SOL_{delta}$, due to a future potential for ESD heating. There would be lesser increases in the $SOL_{delta}$ for larger discharging currents as well, but not as large as the charging currents because discharge currents have less resistance than charging currents.

Referring again to FIG. 4, a datagraph showing a state-of-life factor as a function of vehicle operating time and mileage is shown. Included is a target profile 160, comprising an idealized, linear change in SOL over time and distance driven. A second line 170 comprises a system wherein initial SOL v. time is above the idealized profile, potentially leading to a shorter service life for the ESD 74. Therefore there is a need to have a less aggressive use of the ESD in subsequent usage to optimize ESD life. A third line 180 comprises a system wherein the initial SOL v. time is below the idealized profile, leading to an extended service life for the ESD 74. In this instance, the operating system may be able to more aggressively use the electric machines 56, 72 to propel the vehicle. Furthermore, such a system facilitates more effective utilization of the hybrid propulsion system in a vehicle used in a climate having lower ambient temperatures. Referring now to items 172, 174, 176, there is shown three values for $SOL_{delta}$ that have been calculated in accordance with Eq. 1 above, and the invention as described herein. This information is useable by the hybrid control system to decide on an appropriate level of operation of the electrical machines, in terms of electrical current flow, for the subsequent step, while taking into account effect on life of the ESD using the SOL factor. Therefore, electric machine currents can be controlled in accordance with the general objective of maintaining SOL in accordance with the target profile 160. Varying degrees of control techniques can effect this objective including, for example, establishing (e.g. setting or dictating) machine currents where aggressive control is warranted, e.g. where actual SOL requires gross adjustments to comply with the target profile or SOL is on a track to premature end of life relative to the target profile. Alternatively, merely establishing machine current limits may be more appropriate where less aggressive control is warranted, e.g. where actual SOL requires minor adjustments to comply with the target profile or SOL is on a track to an extended end of life relative to the target profile. In general, it is desirable to converge the actual SOL to the target profile quickly while minimizing overshoot.

The invention has been described with specific reference to the preferred embodiments and modifications thereto. Further modifications and alterations may occur to others upon reading and understanding the specification. It is intended to include all such modifications and alterations insofar as they come within the scope of the invention.

The invention claimed is:

1. Method for operating a hybrid electric powertrain including an electrical energy storage device adapted for exchanging electrical energy with a hybrid vehicular powertrain including first and second electric machines, each machine operable to impart torque to a two-mode, compound-split electro-mechanical transmission having four fixed gear ratios and two continuously variable operating modes, comprising:
   establishing an array of values for current of the electrical energy storage device;
   for each value of the array, pre-calculating a possible change in state of life for the energy storage device, wherein the possible change in the state of life is determined from corresponding values of an integration of electrical current, a depth of discharge of the energy storage device, and, an operating temperature factor of the electrical energy storage device; and
   operating the electric machines to varying degrees of control at a subsequent time-step corresponding to the pre-calculated possible changes in the state of life.

2. The method of claim 1 wherein operating the electric machines to varying degrees of control at a subsequent time-step corresponding to the pre-calculated possible changes in the state of life comprises operating the electric machines to effect a predetermined state of life profile.

3. The method of claim 2 wherein operating the electric machines to effect a predetermined state of life profile comprises limiting allowable electric machine currents corresponding to one of the pre-calculated possible changes in the state of life and the predetermined state of life profile.

4. The method of claim 2 wherein operating the electric machines to effect a predetermined state of life profile comprises establishing electric machine currents corresponding to one of the pre-calculated possible changes in the state of life and predetermined the state of life profile.

5. The method of claim 1 wherein the depth of discharge of the electrical energy storage device is determined from the value for current of the electrical energy storage device.

6. The method of claim 1 wherein the operating temperature factor of the electrical energy storage device is determined from the value for current of the electrical energy storage device and temperature of the electrical energy storage device.

7. Method for operating a hybrid electric powertrain including an electrical energy storage device adapted for exchanging electrical energy with a hybrid vehicular powertrain including first and second electric machines, each machine operable to impart torque to a two-mode, compound-split electro-mechanical transmission having four fixed gear ratios and two continuously variable operating modes, comprising:
   providing an array of potential currents for the electrical energy storage device during periods of vehicle activity;
   for each potential current, pre-calculating a possible effect upon electrical energy storage device state of life comprising pre-calculating changes in the state of life corresponding to a plurality of factors affected by electrical energy storage device current, wherein said plurality of factors affected by electrical energy storage device current comprises a factor corresponding to current integration over time; and
   operating the electric machines to varying degrees of control corresponding to the possible effects upon electrical energy storage device state of life.

8. The method of claim 7 wherein operating the electric machines to varying degrees of control corresponding to one of to the possible effects upon electrical energy storage device state of life comprises operating the electric machines to effect a predetermined state of life profile.

9. The method of claim 8 wherein operating the electric machines to effect a predetermined state of life profile comprises limiting allowable electric machine currents corresponding to the possible effects upon electrical energy storage device state of life and the predetermined state of life profile.

10. The method of claim 8 wherein operating the electric machines to effect a predetermined state of life profile comprises establishing electric machine currents corresponding to the possible effects upon electrical energy storage device state of life and the predetermined state of life profile.

11. Method for operating a hybrid electric powertrain including an electrical energy storage device adapted for exchanging electrical energy with a hybrid vehicular powertrain including first and second electric machines, each machine operable to impart torque to a two-mode, compound-split electro-mechanical transmission having four fixed gear ratios and two continuously variable operating modes, comprising:
   providing an array of potential currents for the electrical energy storage device during periods of vehicle activity;
   for each potential current, pre-calculating a possible effect upon electrical energy storage device state of life comprising pre-calculating possible changes in the state of life corresponding to a plurality of factors affected by electrical energy storage device current, wherein said plurality of factors affected by electrical energy storage device current comprises a factor corresponding to current integration over time, a factor corresponding to depth of discharge of the electrical energy storage device and a factor corresponding to temperature of the electrical energy storage device; and
   operating the electric machines to a selected one of the potential currents of the array corresponding to one of the pre-calculated possible effects upon electrical energy storage device state of life.

* * * * *